United States Patent [19]
Uchikawa et al.

[11] 4,378,329
[45] Mar. 29, 1983

[54] NUCLEAR REACTOR CORE CONSTRUCTION

[75] Inventors: Sadao Uchikawa; Motomasa Fuse; Yasuhiro Kobayashi, all of Hitachi; Renzo Takeda, Kawasaki, all of Japan

[73] Assignee: Hitachi, Ltd., Tokyo, Japan

[21] Appl. No.: 158,363

[22] Filed: Jun. 11, 1980

[30] Foreign Application Priority Data

Jun. 18, 1979 [JP] Japan .................................. 54-77173

[51] Int. Cl.³ ................................................ G21C 3/32
[52] U.S. Cl. ...................................... 376/435; 376/212;
376/419; 376/428; 376/447; 376/449
[58] Field of Search ............................ 176/78, 17, 30;
376/212, 419, 428, 435, 447, 449

[56] References Cited

U.S. PATENT DOCUMENTS

| | | | |
|---|---|---|---|
| 3,141,827 | 7/1964 | Iskenderian | 176/17 |
| 3,844,886 | 10/1974 | Crowther | 176/17 |
| 4,251,321 | 2/1981 | Crowther | 176/17 |

FOREIGN PATENT DOCUMENTS

53-72986 6/1978 Japan .

OTHER PUBLICATIONS

Specker et al., "The BWR Control Cell Core Improved Design"; Trans. Am. Nucl. Soc. 30 (1978), pp. 336–338.
Piascik et al., "BWR Operating Experience at Millstone I w/Cont. Cell Improved Design"; Trans. Am. Nucl. Soc. 32 (1979), p. 706.

Primary Examiner—Donald P. Walsh
Attorney, Agent, or Firm—Antonelli, Terry & Wands

[57] ABSTRACT

A core construction for a nuclear reactor having a multiplicity of fuel cells forming a core in which each fuel cell includes four fuel assemblies arranged in adjacent relationship and one control rod insertable into a position surrounded by the four fuel assemblies. The fuel cells includes first fuel cells each having a relatively high cell mean infinite neutron multiplication factor and including one fuel assembly containing a burnable poison, and second fuel cells each having a relatively low cell mean infinite neutron multiplication factor and including no fuel assembly containing a burnable poison. The first fuel cells are arranged both in a central zone of the core disposed within about one-half the core radius from the center of the core and in a circumferential zone of the core outside the central zone. The second fuel cells are arranged only in the central zone and no second fuel cells are arranged in the circumferential zone. Only the second fuel cells provide control cells in which the control rods are operative to adjust core reactivity changes and power distribution changes during normal power operation of the reactor.

14 Claims, 13 Drawing Figures

NUCLEAR REACTOR CORE CONSTRUCTION

BACKGROUND OF THE INVENTION

This invention relates to core constructions for nuclear reactors, and more particularly it is concerned with a core construction for a boiling-water reactor.

Generally, the core of a boiling-water reactor is composed of a multiplicity of fuel cells each including four fuel assemblies arranged in adjacent relationship and one control rod insertable into a position surrounded by such four fuel assemblies. In a boiling-water reactor of the prior art having such core construction, burning of the nuclear fuel causes variations to occur in the amount of fissionable material produced and the distribution of the amount of such fissionable material during normal power operation of the reactor, and consequently the core shows changes in excess reactivity and changes in power distribution. To offset or adjust such core excess reactivity changes, i.e., core reactivity changes, and such power distribution changes during normal power operation of the reactor, it has hitherto been common practice to, utilizing a plurality of control rods, alter the selection of control rods to be inserted and/or the number of inserted control rods thereby to change the control rod pattern, and/or vary the depths of insertion of control rods without changing the pattern. To this end, it has hitherto been necessary to operate the control rods several times during one operation cycle lasting for one year, for example, to vary the control rod pattern and/or the depths of insertion of the control rods. However, in a core of the prior art, it has been considered necessary to operate the control rods after lowering the power level of the fuel adjacent the control rods below a predetermined level, to ensure that the fuel is maintained in a sound condition. Thus, the present practice followed in varying the control rod pattern and the depths of insertion of the control rods consists in temporarily lowering the reactor power for operating the control rods and then restoring the reactor power to its original level following completion of operation of the control rods. Because of the need to follow such practice, a boiling-water reactor of the prior art has had the disadvantages that its operation procedures are complex and that the rate of utilization of a plant having such reactor is low.

Also, in a boiling-water reactor of the prior art, flattening of the radial power distribution has been unobtainable at the terminating stage of an operation cycle at which the control rods are fully withdrawn, with a result that the center zone of the core has shown a tendency to becoming high in power. This has made it necessary to effect shuffling of the fuel assemblies when fuel replacements are effected upon termination of an operation cycle. This has also been a factor concerned in rendering the operation procedures of a conventional boiling-water reactor complex and lowering the rate of utilization of a plant having such reactor.

SUMMARY OF THE INVENTION

An object of this invention is to provide a core construction for a nuclear reactor which is capable of simplifying the operation procedures of such reactor and increasing the rate of utilization of a plant having such reactor.

Another object is to provide a core construction for a nuclear reactor which makes it possible to reduce the number of control rods operated for offsetting or adjusting core reactivity changes and power distribution changes during normal power operation of the reactor and which eliminates the need to temporarily lower the reactor power level when the control rods are operated.

Still another object is to provide a core construction for a nuclear reactor which enables flattening of the radial power distribution to be obtained at the terminating stage of an operation cycle at which the control rods are fully withdrawn, whereby the need to effect shuffling of the fuel assemblies when fuel replacements are effected can be eliminated.

According to the invention, there is provided a core construction for a nuclear reactor comprising a multiplicity of fuel cells forming a core in which each fuel cell includes four fuel assemblies arranged in adjacent relationship and one control rod insertable into a position surrounded by said four fuel assemblies, wherein said fuel cells includes first fuel cells each having a relatively high cell mean infinite neutron multiplication factor and including one fuel assembly containing a burnable poison, and second fuel cells each having a relatively low cell mean infinite neutron multiplication factor and including no fuel assembly containing a burnable poison, said first fuel cells being arranged both in a central zone of the core disposed within about one-half the core radius from the center of the core and in a circumferential zone of the core outside said central zone of the core, said second fuel cells being arranged only in said central zone of the core and no second fuel cells being arranged in said circumferential zone of the core, only said second fuel cells including control cells in which said control rods are operative to adjust core reactivity changes and power distribution changes during normal power operation of the reactor.

Preferably, said first fuel cells each include fuel assemblies of a relatively high degree of enrichment, and said second fuel cells include fuel assemblies of a relatively low degree of enrichment.

Preferably, said second fuel cells arranged in the central zone of the core include those fuel cells which are disposed substantially along at least one imaginary circle centered at the center of the core.

Preferably, the first fuel cells arranged both in the central zone and the circumferential zone of the core each include four kinds of fuel assemblies substantially equally distinct from one another in the period of time of service in the core, the newest fuel assembly containing a burnable poison.

The first fuel cells arranged in the center zone and the circumferential zone of the core include four kinds of fuel assemblies distinct from one another in the period of time of service in the core by about one year, and the newest fuel assembly may contain a burnable poison.

Preferably, the burnable poison comprises gadolinia.

In the core construction for a nuclear reactor according to the invention, the first fuel cells including one fuel assembly out of a total of four fuel assemblies which contains gadolinia are arranged substantially in the entire area of the core except for some portions of the central zone thereof disposed within about one-half the core radius from the center of the core. By selecting a suitable value for the concentration of the burnable poison contained in a new fuel assembly, it is possible to keep at relatively low levels the core reactivity changes during normal power operation of the reactor. This enables the number of control rods operated for offsetting or adjusting the core reactivity changes and power distribution changes during normal power operation of the reactor to be reduced. Moreover, in the core construction according to the invention, the second fuel cells having a relatively low cell mean infinite multiplication factor are arranged in some portions of the central zone of the core, and only the second fuel cells comprises control cells having the reduced number of control rods which are operated to adjust the core reactivity changes. Since the power level of the fuel of the control cells regulated by the infinite neutron multiplication factor of the second fuel cells can be set at a level which is lower than the mean power level of the core regulated by the infinite neutron multiplication factor of the first fuel cells and thus is lower than the level required for keeping the fuel in a sound condition during operation of control rods, and therefore the need to temporarily lower the reactor power which would otherwise occur in operating the control rods for offsetting or adjusting the core reactivity changes and power distribution changes during normal power operation of the reactor can be eliminated.

Moreover, in the core construction according to the invention, the arrangement that the second fuel cells having a relatively low cell mean infinite neutron multiplication factor are disposed in the central zone of the core as described hereinabove contributes to obtaining substantial flattening of the radial power distribution across the core at the terminating stage of an operation cycle at which the control rods are substantially fully withdrawn, so that the need to effect shuffling of the fuel assemblies when fuel replacements are effected can be substantially eliminated.

As is clear from the foregoing description, the second fuel cells having a relatively low cell mean infinite neutron multiplication factor have the dual function of serving to adjust the radial power distribution across the core and serving as control cells in which the control rods are operated for offsetting or adjusting the core reactivity changes. The second fuel cells having such dual function can be obtained by using not only a fuel of low degree of enrichment but also a fuel having a relatively high degree of burn-up or exposure.

From the foregoing, it will be understood that the core construction for a nuclear reactor according to the invention contributes to simplification of the operation procedures of the nuclear reactor and increasing the rate of utilization thereof.

DESCRIPTION OF THE PREFERRED EMBODIMENT

Figure 1:
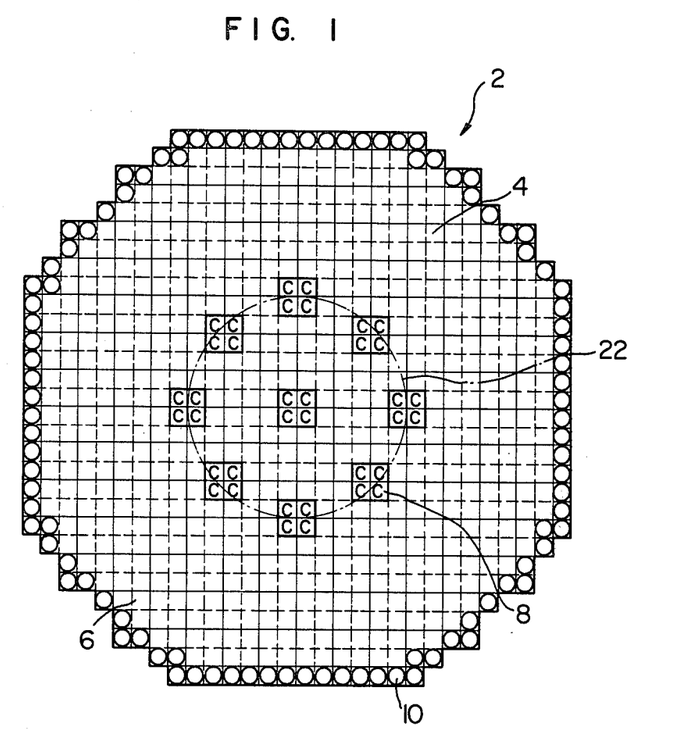
FIG. 1 is a schematic sectional view of the core construction for a nuclear reactor comprising one embodiment of the invention.

Referring to FIG. 1, a core, generally designated by the numeral 2, of a boiling-water reactor of a heat output of 3300 MW which incorporates therein one embodiment of the core construction in conformity with the invention comprises a multiplicity of fuel cells 4 each including four fuel assemblies arranged in adjacent relationship and one control rod insertable into a position surrounded by such four fuel assemblies.

The fuel cells 4 include first fuel cells 6 each having a relatively high cell mean infinite neutron multiplication factor and including one fuel assembly out of the four fuel assemblies which contains a burnable poison, preferably gadolinia, and second fuel cells 8 each having a relatively low cell mean infinite neutron multiplication factor and including no fuel assembly containing a burnable poison. In FIG. 1, the first fuel cells 6 are each represented by a broken-line block divided by thin lines into four squares having no symbols, and the second fuel cells 8 are each represented by a thick-line block divided by thin lines into four squares each having a symbol C. Thus the second fuel cells 8 are arranged only in a central zone of the core disposed within about one-half the core radius from the center of the core and not arranged in a circumferential zone of the core outside the central zone. Stated differently, the central zone of the core 2 disposed within about one-half the core radius from the center of the core is composed of both the first fuel cells 6 and second fuel cells 8, and the majority of the circumferential zone of the core outside the center zone is only composed of the first fuel cells 6 and no second fuel cells 8 are present therein.

Arranged at the outermost area of the circumferential zone of the core 2 are fuel assemblies 10 which have, as a fresh fuel, a mean infinite neutron multiplication factor substantially equal to the mean infinite neutron multiplication factor of the fuel assemblies of the first fuel cells 6 but distinct from the fuel assemblies of the first fuel cells 6 in the specifications of the burnable poison. That is, for reasons subsequently to be stated, the burnable poison contained in the fuel assemblies 10 has, as a fresh fuel, a concentration which is kept at a lower level than that of the burnable poison contained in the fuel aysemblies of the first fuel cells 6.

Figure 2:
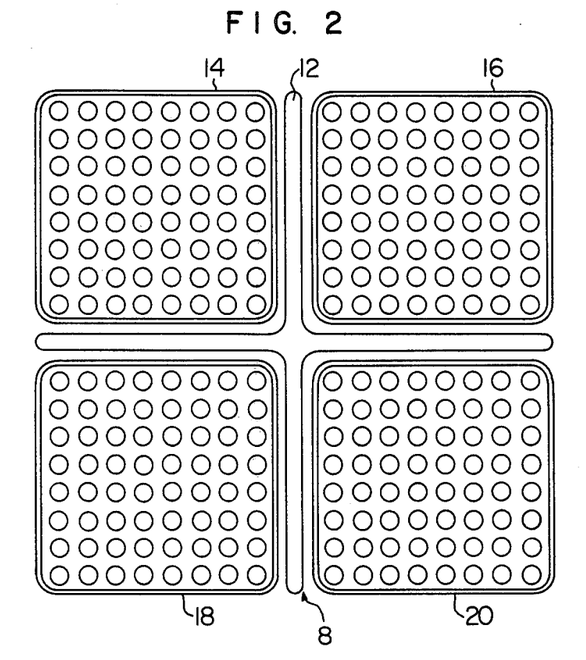
FIG. 2 is a schematic sectional view, on an enlarged scale, of a fuel cell serving as a control cell in the core construction shown in FIG. 1.

Referring to FIG. 2, the second fuel cells 8 provide control cells in which control rods 12 are operated during normal power operation of the reactor, to offset or adjust changes in excess reactivity of the core 2 and changes in power distribution of the core. Thus the control rods 12 are inserted into positions surrounded by the fuel assemblies 14, 16, 18 and 20 in a predetermined pattern and to predetermined depths.

In the embodiment shown in FIG. 1, nine second fuel cells 8 are disposed in the central zone of the core 2, with one second fuel cell 8 being located in the center of the core and eight second fuel cells 8 being arranged substantially along an imaginary circle 22 centered at the center of the core 2 and spaced apart from one another substantially equidistantly. The invention is not limited to this pattern of second fuel cell arrangement and other pattern of arrangement may be adopted.

In the embodiment shown in FIG. 1, the control rods of the first fuel cells 6 and for the fuel assemblies 10 are fully withdrawn during normal power operation of the reactor and they are adapted to be quickly inserted into the core together with the control rods 12 of the second fuel cells 8 only when it is necessary to shut down the reactor.

The constructions of the fuel assemblies used in the first fuel cells 6 and second fuel cells 8 and the outermost fuel assemblies 10 will be described by referring to FIGS. 3a–3c.

Figure 3A:
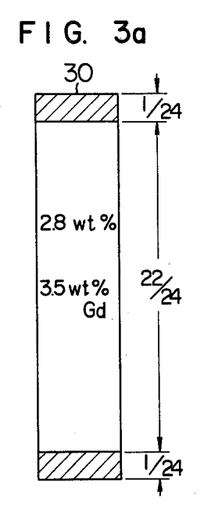
FIGS. 3a–3c are schematic views showing three kinds of fuel assemblies used in the core construction shown in FIG. 1.

In FIG. 3a, there is shown a fuel assembly 30 used for the first fuel cell 6 having a mean degree of fuel enrichment of about 2.8 wt%. The fuel assembly 30 has seven gadolinia-containing fuel rods, and each of these seven gadolinia-containing fuel rods has gadolinia concentration and distribution which are selected such that when the fuel assembly 30 is axially divided into twenty-four equal nodes, the concentration is about 3.5 wt% in the twenty-two nodes except for the uppermost and lowermost nodes which have a concentration of about 1.5 wt%. FIG. 3b shows a fuel assembly 32 used for the second fuel cell 8 which has a mean degree of fuel enrichment of about 1.1 wt% and which includes no gadolinia-containing fuel rod. FIG. 3c shows a fuel assembly 34 used as the outermost fuel assembly 10 having a mean degree of fuel enrichment of about 2.8 wt%. The fuel assembly 34 has seven gadolinia-containing fuel rods, and each of these seven gadolinia-containing fuel rods has gadolinia concentration and distribution which are selected such that the concentration of gadolinia is about 1.5 wt% through the entire length of the fuel assembly 34. The concentration of gadolinia is reduced at the upper and lower ends of the fuel assembly 30 and in the outermost fuel assembly 34 because the presence of unburned gadolinia at the upper and lower ends of the core and in the outermost area thereof at the terminating stage of an operation cycle can be avoided.

Figure 3B:
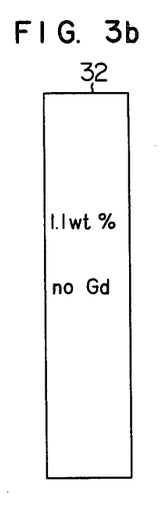
Figure 3C:
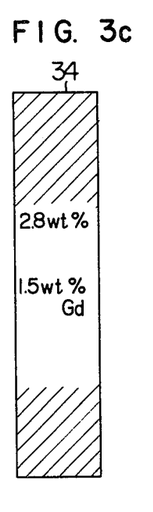
Figure 4A:
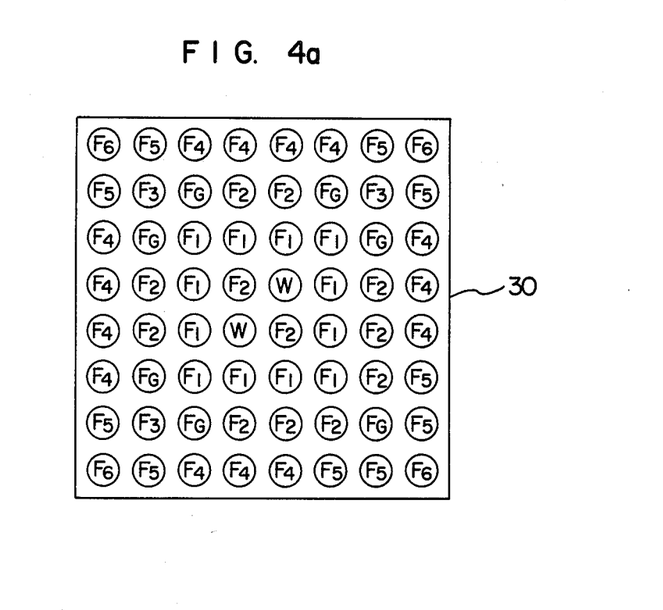
FIGS. 4a and 4b are a schematic sectional view of the fuel assembly shown in FIG. 3a and a schematic view, respectively, showing the degrees of enrichment of the fuel and the concentration of gadolinia in a plurality of kinds of fuel rods of this fuel assembly.
Figure 4B:
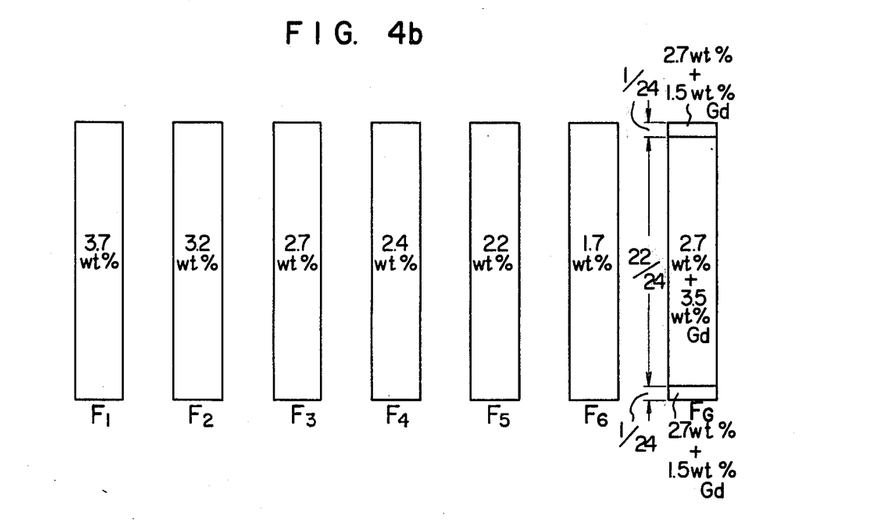
Figure 5A:
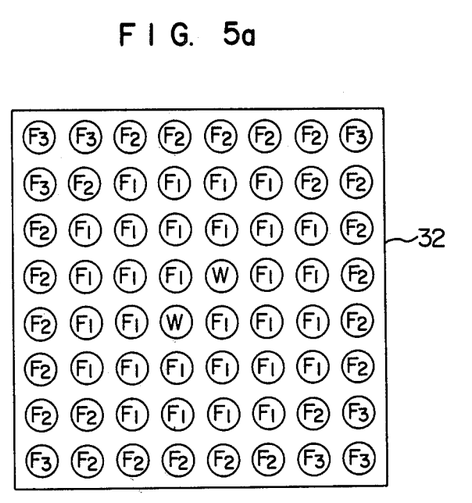
FIGS. 5a and 5b are a schematic sectional view of the fuel assembly shown in FIG. 3b and a schematic view, respectively, showing the degrees of enrichment of the fuel in a plurality of kinds of fuel rods of this fuel assembly.
Figure 5B:
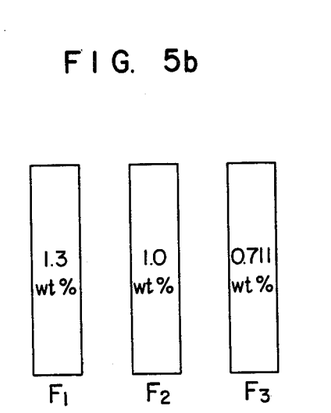
Figure 6A:
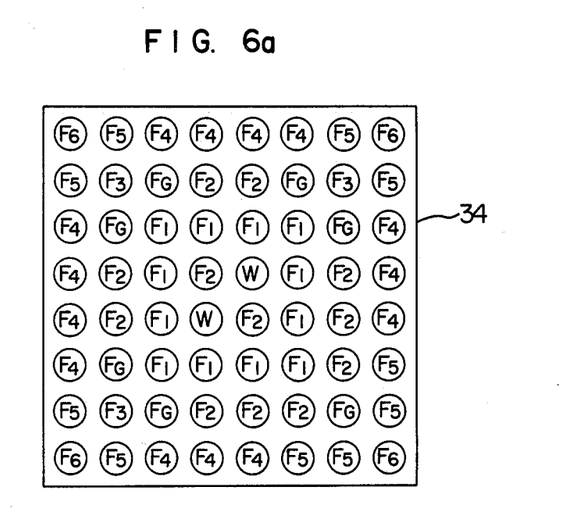
FIGS. 6a and 6b are a schematic sectional view of the fuel assembly shown in FIG. 3c and a schematic view, respectively, showing the degrees of enrichment of the fuel and the concentration of gadolinia in a plurality of kinds of fuel rods of this fuel assembly.
Figure 6B:
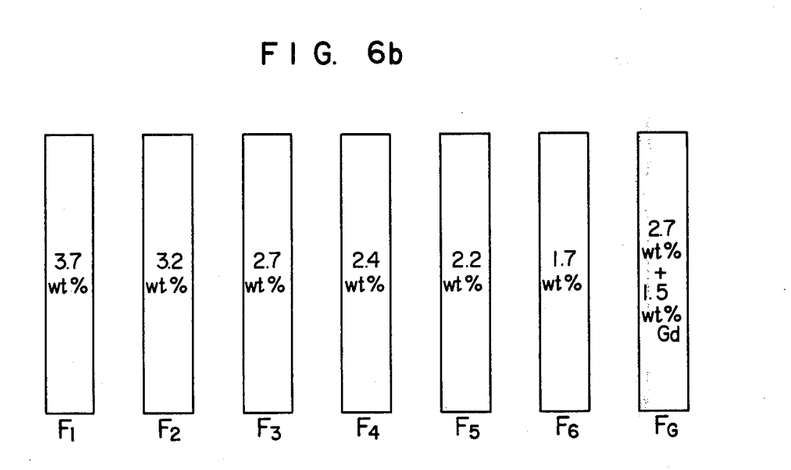

The fuel assemblies shown in FIGS. 3a–3c are shown in concrete constructional form in FIGS. 4a–6b. FIGS. 4a, 5a and 6a are schematic horizontal views of the fuel assemblies 30, 32 and 34 respectively in which each fuel assembly is shown as having a plurality of fuel rods in positions in which symbols are disposed in circles. FIGS. 4b, 5b and 6b show the degrees of fuel enrichment of fuel rods of the different kinds of fuel assemblies and the concentrations of gadolinia where the fuel rods contain the burnable poison, the fuel rods being designated by symbols indicated below them. In FIGS. 4a and 4b, 5a and 5b, and 6a and 6b, the fuel rods designated by like reference symbols are of the same kind. In FIGS. 4a and 4b, and 6a and 6b, the symbols $F_1$–$F_6$ designate fuel rods containing no gadolinia and each having a degree of fuel enrichment indicated therein, while the symbol $F_G$ designates gadolinia-containing fuel rods each having a degree of fuel enrichment and a gadolinia concentration indicated therein. In FIGS. 5a and 5b, the symbols $F_1$–$F_6$ designate fuel rods containing no gadolinia and each having a degree of fuel enrichment indicated therein. In all the figures, the symbol W designates water rods.

Figure 7:
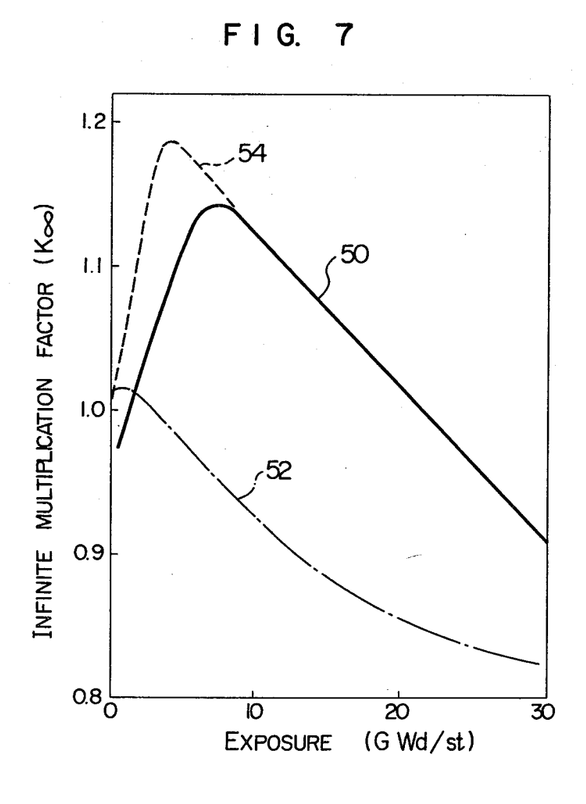
FIG. 7 is a diagram showing changes in infinite neutron multiplication factor occurring in conjunction with burning of the three kinds of fuel assemblies shown in FIGS. 3a–3c, in explanation of the principle of operation of the core construction according to the invention.

FIG. 7 shows changes occurring in infinite neutron multiplication factor as burning of each fuel assembly proceeds. In the diagram shown in the figure, the ordinate represents the infinite neutron multiplication factor ($K\infty$) and the abscissa indicates the degree of burn-up or exposure (GWd/st). A curve 50 shows a change in infinite neutron multiplication factor occurring in the major portion of the fuel assembly 30 used for the first fuel cell 6 except for the upper and lower end portions thereof, a curve 52 shows a change in infinite neutron multiplication factor occurring in the fuel assembly 32 used for the second fuel cell 8, and a curve 54 shows a change in infinite neutron multiplication factor occurring in such fuel assembly 34 used as the outermost fuel assemblies 10 and in the upper and lower end portions of the fuel assembly 30 used for the first fuel cells 6.

The characteristics of the core 2 as a whole are determined substantially by the characteristics of the fuel assemblies 30 used for the first fuel cells 6 which account for the majority of the core 2. The fuel assemblies 30 are arranged in a four-batch scattered loading area of the core 2 where fuel shuffling is rarely effected. Thus the first fuel cells 6 each including four fuel assemblies 30 disposed in adjacent relationship each include those four fuel assemblies 30 which are in the first year, second year, third year and fourth year respectively of service in the core 2. The degree of exposure during one operation cycle is about 6.15 GWd/st and the fuel in the major portions of the core 2 shows a tendency to progress its burning. Thus, as shown in FIG. 7, in the fuel assemblies 30 that have experienced a service of over one year in the core 2, the gadolinia contained therein has been consumed so that the fuel assemblies 30 show a reduction in infinite neutron multiplication factor with the progress of burning. Thus the fuel assemblies 30 in the second year, third year and fourth year of service show a reduction in infinite neutron multiplication factor with the progress of burning, while the fuel assemblies 30 in the first year of service shows an increase in infinite neutrom multiplication factor with the progress of burning. Also, as shown in FIG. 7, the rate of increase in infinite neutron multiplication factor of the fuel assemblies 30 in the first year of service is about three times as great as the rate of reduction in infinite neutron multiplication factor of the fuel assemblies 30 in the second to fourth year of service. As a result, the cell mean infinite neutron multiplication factor shows very little fluction over one operation cycle as measured by one set of four fuel assemblies of each fuel cell. By this feature, the core 2 shows very little changes in excess reactivity with the progress of burning, so that it is possible to reduce the number of control rods operated during normal power operation of the reactor to below nine.

As shown in FIG. 7, the fuel assembly 32 used for the second fuel cell 8 has a relatively low infinite neutron multiplication factor over the entire period of exposure. This eliminates the need to lower the reactor power when the control rods of the second fuel cells 8 are operated to offset or adjust core reactivity changes and power distribution changes during normal power operation of the reactor.

Figure 8:
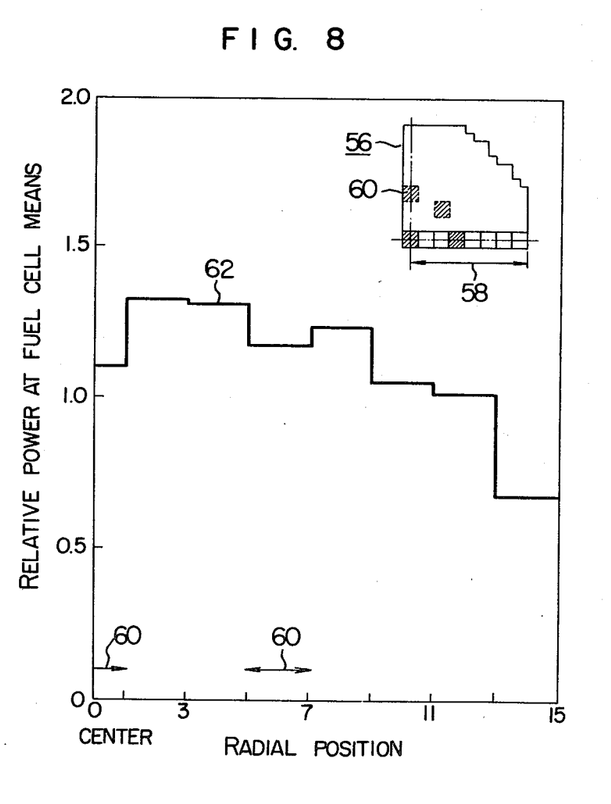
FIG. 8 is a diagram showing a radial relative power distribution at fuel cell means across the core obtained at the terminating stage of an operation cycle at which the control rods are fully withdrawn in the core construction shown in FIG. 1, illustrating one of the effects achieved by the invention.

FIG. 8 shows a radial distribution of cell mean relative powers of the core at the terminating stage of an operation cycle at which all the control rods are fully withdrawn. In the diagram shown in the figure, the ordinate represents the relative power at fuel cell means, and the abscissa indicates the radial position of the core, the relative power at fuel cell means being an average value for four fuel assemblies of one fuel cell. In the upper right portion of FIG. 8, there is shown a ¼ core in which 58 designates the positions in which the relative powers are calculated, 60 designates the positions in which the second fuel cells 8 are located, and 62 designates a radial distribution of relative powers of the core. It will be seen in FIG. 8 that the portions of the core 2 in which the second fuel cells 8 are located are low in relative power, thereby contributing to flattening of the radial power distribution.

From the foregoing description, it will be appreciated that the core construction according to the invention provides a core which offers many advantages. That is, the need to effect fuel shuffling at the time of fuel replacements is eliminated, and the reactor can be operated by using a small number of control rods. The need to lower the reactor power when the control rods are operated during normal power operation of the reactor is eliminated, and even the alteration of the control rod pattern is made unnecessary. Thus the invention is conducive to simplified operation procedures of the nuclear reactor, increased utilization rate of a nuclear power plant and increased thermal reserve.

What is claimed is:

1. A core construction for a nuclear reactor comprising a multiplicity of fuel cells forming a core in which each fuel cell includes four fuel assemblies arranged in adjacent relationship and one control rod insertable into a position surrounded by said four fuel assemblies, wherein said fuel cells include first fuel cells each having a relatively high cell mean infinite neutron multiplication factor and including one fuel assembly containing a burnable poison, and second fuel cells each having a relatively low cell mean infinite neutron multiplication factor and including no fuel assembly containing a burnable poison, said first fuel cells being arranged both in a central zone of the core and in a circumferential zone of the core outside said central zone of the core, said second fuel cells being arranged only in said central zone of the core and no second fuel cells being arranged in said circumferential zone of the core, only said second fuel cells including control cells in which said control rods are operative to adjust core reactivity changes and power distribution changes during normal power operation of the reactor.

2. A core construction as claimed in claim 1, wherein said first fuel cells each include fuel assemblies of a relatively high degree of enrichment, and said second fuel cells each include fuel assemblies of a relatively low degree of enrichment.

3. A core construction as claimed in claim 1, wherein said second fuel cells arranged in said central zone of the core include those fuel cells which are disposed substantially along at least one imaginary circle centered at the center of the core.

4. A core construction as claimed in claim 1, 2 or 3, wherein said first fuel cells arranged both in said central zone and said circumferential zone of the core each include four kinds of fuel assemblies substantially equally distinct from one another in the period of time of service in the core, the newest fuel assembly containing a burnable poison.

5. A core construction as claimed in claim 1, 2 or 3, wherein said first fuel cells arranged both in said central zone and said circumferential zone of the core each include four kinds of fuel assemblies distinct from one another in the period of time of service in the core by about one year, the newest fuel assembly containing a burnable poison.

6. A core construction as claimed in claim 4, wherein said burnable poison comprises gadolinia.

7. A core construction as claimed in claim 1, wherein the outermost area of the circumferential zone of the core comprises fuel assemblies different from the fuel assemblies of said first and second fuel cells and having a mean infinite neutron multiplication factor substantially equal to the mean infinite neutron multiplication factor of the fuel assemblies of said first fuel cells.

8. A core construction as claimed in claim 7, wherein the outermost area fuel assemblies contain a burnable poison having a concentration different from the fuel assemblies of said first fuel cells.

9. A core construction as claimed in claim 8, wherein the outermost area fuel assemblies have a burnable poison concentration less than the burnable poison concentration of the fuel assemblies of said first fuel cells.

10. A core construction as claimed in claim 7, wherein said control rods arranged for insertion into the core adjacent the outermost area fuel assemblies and adjacent the fuel assemblies of said first fuel cells are fully withdrawn during normal power operation of the reactor.

11. A core construction as claimed in claim 3, wherein one of said second fuel cells is arranged at the center of the core.

12. A core construction as claimed in claim 5, wherein said burnable poison comprises gadolinia.

13. A core construction as claimed in claim 1, wherein said central zone of the core is disposed within about one-half the core radius from the center of the core.

14. A core construction as claimed in claim 7, wherein said central zone of the core is disposed within about one-half the core radius from the center of the core.

* * * * *